United States Patent [19]
Lee

[11] Patent Number: 5,490,708
[45] Date of Patent: Feb. 13, 1996

[54] MULTIPURPOSE AUTOMOBILE SUNVISOR

[76] Inventor: Jong D. Lee, 2/3, 55 Bon-dong, Tongjak-gu, Seoul 156-060, Rep. of Korea

[21] Appl. No.: 244,640

[22] PCT Filed: Oct. 8, 1993

[86] PCT No.: PCT/KR93/00091

§ 371 Date: Jun. 8, 1994

§ 102(e) Date: Jun. 8, 1994

[87] PCT Pub. No.: WO/9408812

PCT Pub. Date: Apr. 28, 1994

[30]  Foreign Application Priority Data

Oct. 8, 1992 [KR] Rep. of Korea .......................... 92-18505

[51] Int. Cl.⁶ ............................................. B60J 3/02
[52] U.S. Cl. ............................. 296/97.8; 160/170; 49/352
[58] Field of Search .............................. 296/97.4, 97.8, 296/97.9, 140, 141, 97.6; 160/167 R, 170 R; 49/352

[56]  References Cited

U.S. PATENT DOCUMENTS

| | | | |
|---|---|---|---|
| 2,931,114 | 4/1960 | Peterson | 40/10 |
| 4,617,699 | 10/1986 | Nakamura | 296/97.9 X |
| 4,696,510 | 9/1987 | Zwirner | 296/97.13 |
| 5,197,777 | 3/1993 | Lanser et al. | 296/97.8 |

FOREIGN PATENT DOCUMENTS

| | | | |
|---|---|---|---|
| 2258005 | 11/1972 | Germany | 296/97.8 |
| 4110224 | 4/1992 | Japan | 296/97.9 |
| 323380 | 1/1930 | United Kingdom | 49/352 |
| 8300846 | 3/1983 | WIPO | 296/97.9 |

OTHER PUBLICATIONS

SU, 1167048, Abstract, Jul. 15, 1985, Derwent Information Limited.

*Primary Examiner*—Dennis H. Pedder
*Attorney, Agent, or Firm*—Lowe, Price, LeBlanc & Becker

[57]  ABSTRACT

A multipurpose automobile sunvisor for shading direct rays of sunlight includes a main body (10)comprised of a pair of panel members (11)and (12); a bent supporting bar (21) one end of which is rotatably engaged with an upper portion of main body (10) and the other end of which is secured onto the automobile's chassis; a socket portion (24) engaging with the other end of said bent supporting bar (21); a light-shading portion (30) having a light-shading screen (31) tinted for screening the direct rays of light, and a receiving slot (13) built in main body (10) for receiving the light-shading screen; a light-shading-screen miser (300) for pulling light-shading screen (31) of light-shading portion (30) into receiving slot (13) of main body (10); a writing equipment installed on main body (10) and having a writing instrument (41); and a writing instrument drawing device (50) for restoring the writing instrument in pen holder (42). A multipurpose automobile sunvisor not only effectively screens the direct rays of light but also provides conveniences for writing and carrying the light-shading screen.

8 Claims, 6 Drawing Sheets

MULTIPURPOSE AUTOMOBILE SUNVISOR

TECHNICAL FIELD

The present invention relates to a multipurpose automobile sunvisor, and more particularly to a multipurpose automobile sunvisor which comprises memo-pads and writing equipment and which can be moved horizontally, vertically or rotatably.

BACKGROUND ART

In general, an automobile sunvisor is an implement which is usually mounted approximately where the ceiling of the cab interior meets the windshield, and is used for shielding light by horizontal and/or vertical movements. Such sunvisors are made of approximately rectangular plates whose horizontal dimension is greater than its vertical dimension and which are enclosed by a textile or synthetic resin such as polyvinyl. Also, the automobile sunvisor has a supporting bar at one end thereof, with the supporting bar hinge-combined with a socket portion formed on some point of the automobiles's chassis. Further, the sunvisor has a rod portion on another edge portion of the panel thereof, with the rod portion interlocked with or released from a clip portion established on another point of the chassis.

The supporting bar call be moved horizontally, vertically or rotatably, by the engagement with the socket portion which is formed on the ceiling. Also, the rod portion has preferably a smaller diameter than that of the panel thickness and is engaged with or released from the clip portion which is also established on the ceiling.

On the other hand, holders or pockets can be fixed upon the surface of such sunvisors, for the management of papers. Accordingly, automobile sunvisors can provide much convenience ill keeping notes or maintaining documents, as well as shielding light.

However, with the conventional automobile sunvisor the driver's view is limited by the sunvisor itself when it is lowered below the level of his or her eyes, such that strong light cannot be shielded efficiently. Also, the prior art automobile sunvisor exhibits further drawbacks in that properly designed means are not supplied for promptly making a note in the event of all emergency such as a traffic accident or for displaying the owner's telephone number or address when parked.

DISCLOSURE OF THE INVENTION

Therefore, to overcome the above drawbacks, it is an object of the present invention to provide an automobile sunvisor made of synthetic resin and shielding sunlight.

To overcome other drawbacks, it is another object of the present invention to provide an automobile sunvisor comprising a memopad and writing instruments for the prompt recording of information.

To accomplish the above object, the present invention provides a multipurpose automobile sunvisor, which comprises: a main body 10 which is roughly rectangular and comprised of a pair of panel members 11 and 12; a bent supporting bar 21 one end of which is rotatably engaged with an upper portion of main body 10 and the other end of which is secured onto the automobile's chassis; a socket portion 24 engaging with the other end of bent supporting bar 21; a light-shading portion 30 having a light-shading screen 31 tinted for screening the direct rays of light, and a receiving slot 13 built in main body 10 for receiving thereinto light-shading screen 31; and light-shading screen raising means 300 for pulling light-shading screen 31 of light-shading portion 30 into receiving slot 13 of main body 10.

To accomplish the other object, the present invention provides a multipurpose automobile sunvisor, which comprises: a main body 10 which is roughly rectangular and comprised of a pair of panel members 11 and 12; a bent supporting bar 21 one end of which is rotatably engaged with an upper portion of main body 10 and the other end of which is secured onto the automobile's chassis; a socket portion 24 engaging with the other end of the bent supporting bar 21; writing means 40 having a writing instrument 41, a draw string 45 tied to the end of writing instrument 41, and a pen holder 42 installed on main body 10 for gripping writing instrument 41; and a writing instrument drawing means 50 for pulling draw string 45 so as to restore the writing instrument to be placed in the pen holder.

BEST MODE FOR CARRYING OUT THE INVENTION

The preferred embodiments of the present invention will be described below in more detail with reference to the accompanying drawings.

Figure 1:
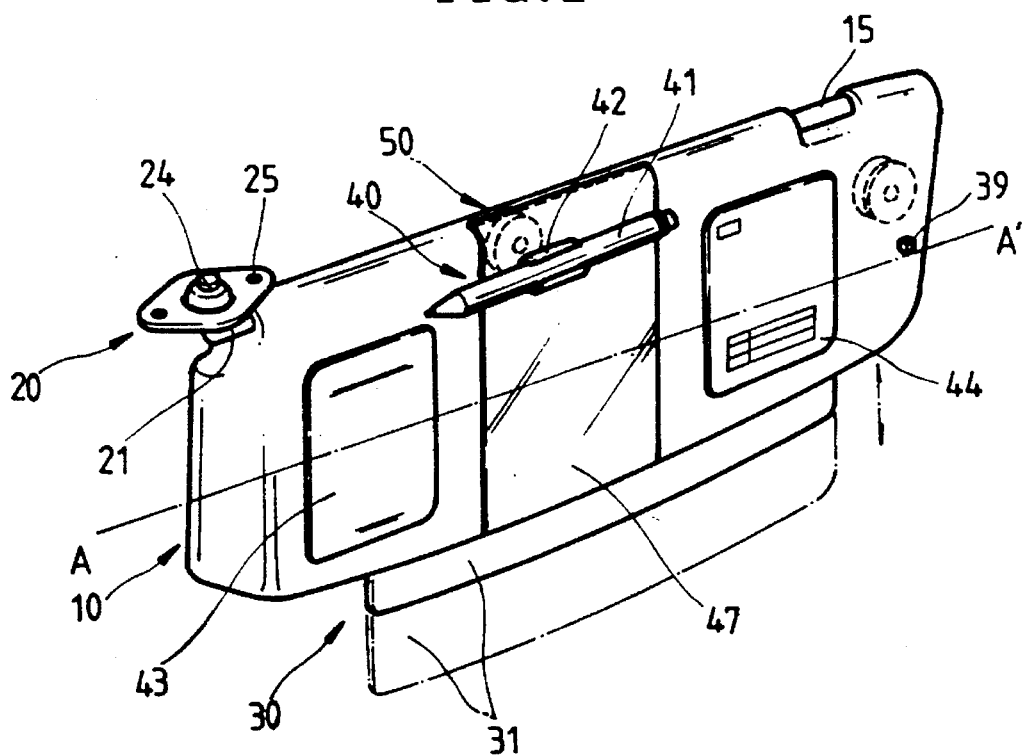
FIG. 1 is a perspective view of a multipurpose automobile sunvisor according to the present invention.

FIG. 1 is a perspective view of a multipurpose automobile sunvisor according to the present invention. Referring to FIG. 1, a multipurpose automobile sunvisor of the present invention comprises a main body 10 whose horizontal dimension is greater than its vertical dimension, a hinge 20 formed on the top of one end of main body 10, a light shading portion 30 formed in the main body to receive a light-shading screen 31 for shading direct rays of light, a light-shading screen raising device 300 tier pulling light-shading screen 31 of the light-shading portion into the main body, writing means 40 provided on the front surface of the main body and having a writing instrument holder 42 for holding a writing instrument 41, and a writing instrument drawing device 50 or returning writing instrument 41 of writing means 40 to its original position. Hinge 20 has a supporting bar 21 fixed to one end of the upper portion of main body 10, a socket 24 connected to one end of supporting bar 21, and bolt openings 25 for bolt-connecting to the ceiling of an automobile.

Figure 2:
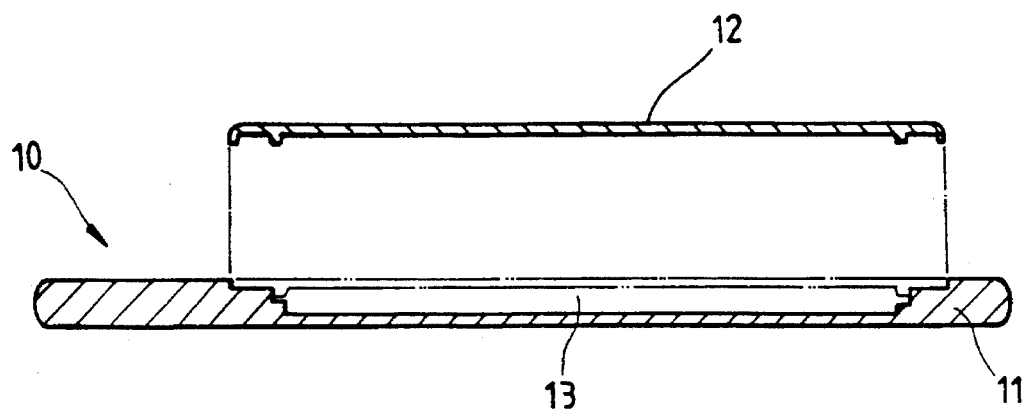
FIG. 2 is a sectional view showing a main body of the multipurpose automobile sunvisor taken along line A—A' shown in FIG. 1.

FIG. 2 is a sectional view of the multipurpose automobile sunvisor taken along line A—A' of FIG. 1. Referring to FIG. 1, main body 10 is composed of two panel members 11 and 12. Panel member 12 is formed to be smaller than panel member 11, and is combined with panel member 11. A receiving slot 13 for receiving light-shading screen 31 of FIG. 1 is formed in the gap between the two panel members 11 and 12.

Figure 3:
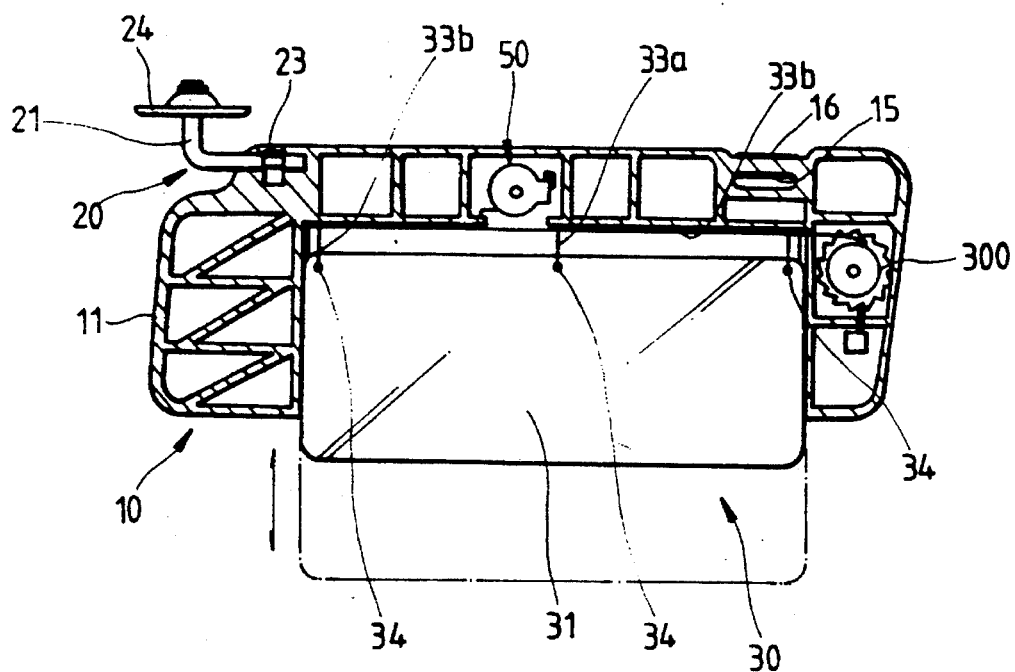
FIG. 3 is a sectional view showing inside of the multipurpose automobile sunvisor shown in FIG. 1.

FIG. 3 shows the inside of the multipurpose automobile sunvisor according to the present invention shown in FIG. 1. Relating to FIG. 3, supporting bar 21 of hinge 20 is fixed with a clip in the upper left portion of main body 10. Three holes 34 are formed in the upper portion of light-shading screen 31 of light-shading portion 30. Draw strings 33a and 33b are threaded to the holes so as to provide suspending means for preventing light-shading screen 31 from becoming separated from main body 10. Reference numeral 300 represents a light-shading screen raising device for pulling the light-shading screen into receiving slot 13 of main body 10. Reference numeral 15 represents a rod having a relatively smaller diameter than supporting bar 21. Reference numeral 16 represents a clip connected with rod 15.

LIGHT-SHADING-SCREEN RAISING DEVICE

Figure 4:
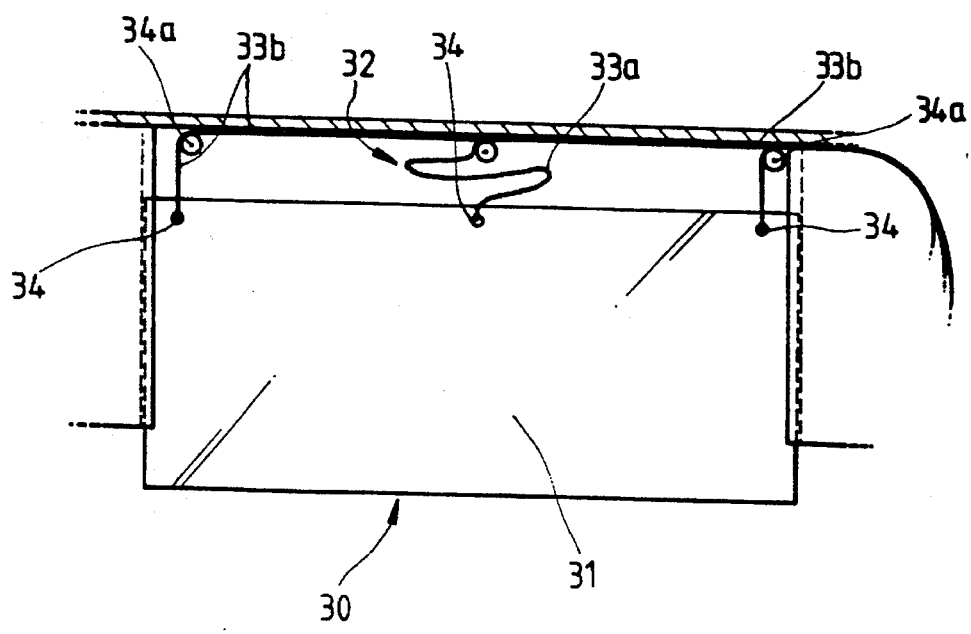
FIGS. 4 and 5 show the operation of a light-shading portion of the multipurpose automobile sunvisor according to the present invention.

FIG. 4 shows a light-shading portion 30 shown in FIG. 3. Referring to FIG. 4, light-shading screen 31 is darkened to shade sunlight. Here, in order to darken light-shading screen 31, a film for shielding direct rays of light may be coated onto a transparent glass or a synthetic resin plate, or tinting process may be performed during the molding of the glass or synthetic resin. It does not matter which one of the two methods is chosen. Light-shading screen 31 may be inserted into or extracted from the main body, having roughly the same width as that of receiving slot 13. When the light-shading screen is inserted into receiving slot 13, the lower portion thereof should be slightly protruded from receiving slot 13. This is to let a user pull on the protruding portion. Otherwise, an additional device is required so that the user may withdraw the light-shading screen outside main body 10, which is undesirable.

Suspending means 32 is made so that, when the user pulls light-shading screen 31 the light-shading screen cannot be pulled beyond the length of central string 33a in order to prevent the light-shading screen from being completely detached from main body 10. Here, the upper portion of light-shading screen 31 is threaded. On the other hand, the draw strings are guided by pulleys 34a each of which is held in place at a predetermined hole arranged on the pair of panel members 11 and 12.

Figure 5:
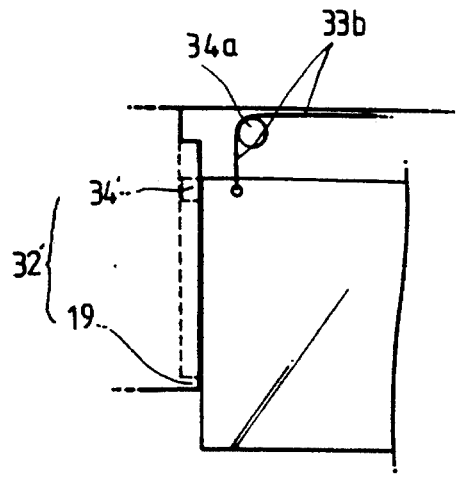

FIG. 5 illustrates blocking means 32' in another embodiment according to the present invention. Referring to FIG. 5, a stop edge 34' is formed on one or both sides of light-shading screen 31. Protruded edge 19 of the main body is hooked by stop edge 34'.

In order to prevent the eyes of a user from becoming temporarily blinded by intensive sunlight or the headlights of an oncoming vehicle, the light is shielded by pulling light-shading screen 31 down from main body 10. When the light shielding becomes unnecessary, light-shading screen 31 is replaced inside receiving slot 13.

Figure 7:
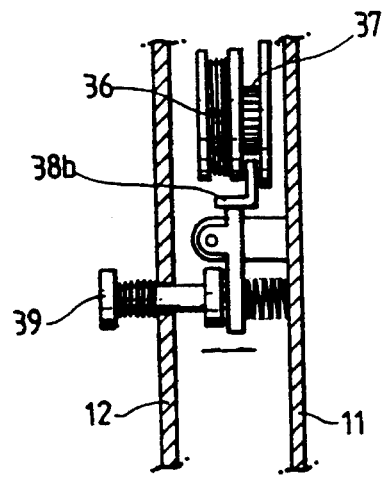
FIGS. 6 and 7 show the structure of a light-shading-screen drawing means of the multipurpose automobile sunvisor shown in FIG. 1.
Figure 6:
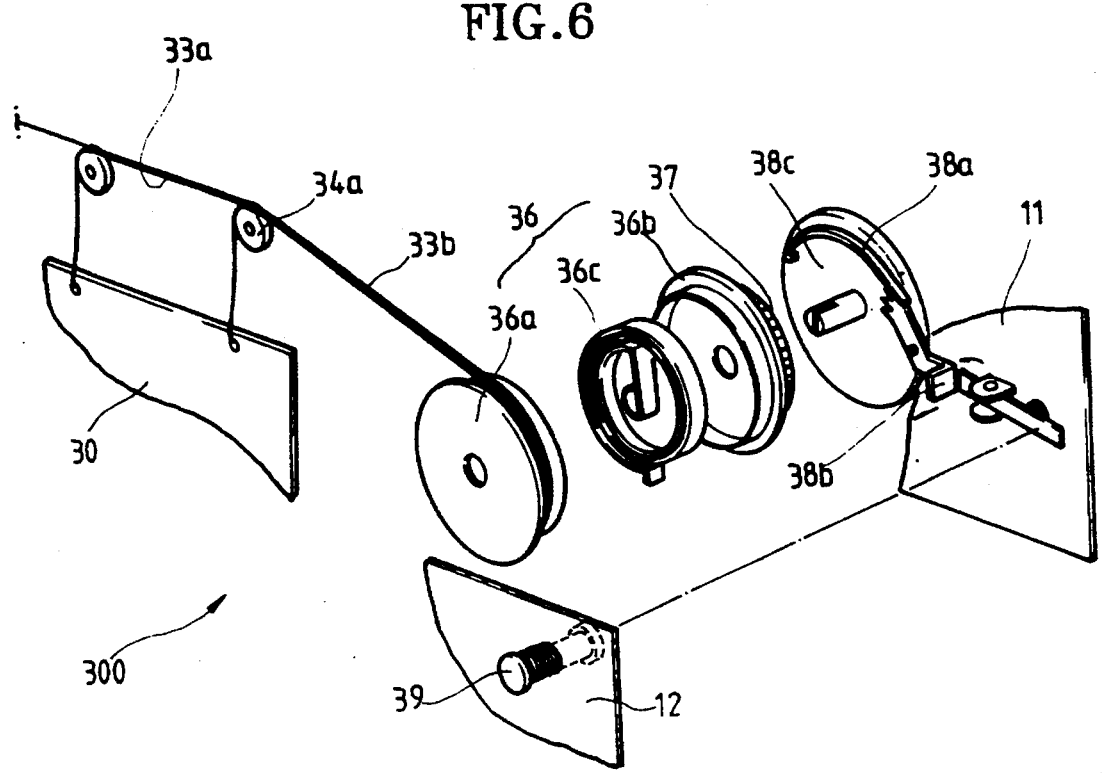
Figure 8:
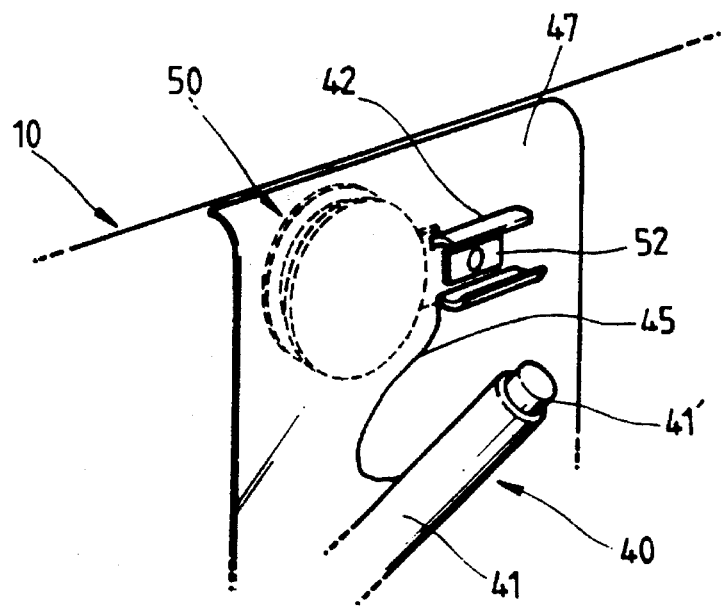
FIGS. 8–11 show writing equipment and pen drawing means of the multipurpose automobile sunvisor according to the present invention.
Figure 10:
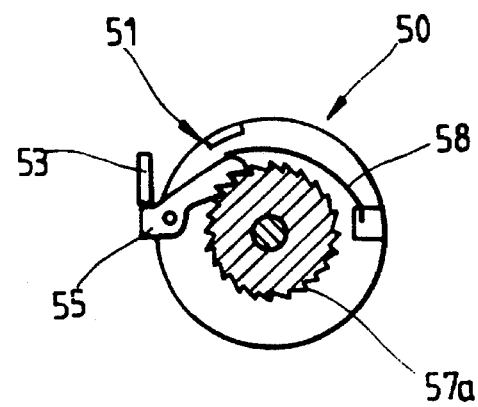

FIGS. 6 and 7 show light-shading-screen raising means for pulling the light-shading screen according to the present invention. Referring to FIGS. 6 and 7, a drum assembly 36 includes drum members 36a and 36b and a coil spring 36c. Here, strings threaded to the ends of light-shading screen 31 are wound around an outer circumference a drum member 36a, and a coil spring 36c is located inside a pair of drum members 36a and 36b such that the drum assembly is elastically biased in the clockwise direction, with the coil spring one end of which is secured onto an innerwall of the drum member and the other end of which is secured by the axial shaft of a fixed plate 38c. Sprocket 37, which is similar to sprocket 57a of FIG. 10, is locked by connecting with latch 38b. Here, when a lock-releasing button protruding from panel member 11 is pressed, latch 38b and sprocket 37 are separated so that strings are wound around the outer periphery the drum member. Therefore, light-shading screen 31 is withdrawn into receiving slot 13.

With the structure of the light-shading-screen raising device, when a user pulls light-shading screen 31, strings wound around the drum are pulled taut to rotate drum members 36a and 36b. The energy consumed in rotating the drum is stored in coil spring 35. Since latch 38b is locked by sprocket 37 due to the resilient force of a plate spring 38a, even when the force of pulling light-shading screen 31 is removed, the reverse rotation of sprocket 37 due to the restoring force stored in the coil spring is prevented to maintain a state in which light-shading screen 31 is extracted at a given position.

Meanwhile, when a user presses lock-releasing button 39, latch 38b retreats so that drum members 36a and 36b are rotated due to the restoring force of coil spring 35 and thereby string 33b is wound around the outer periphery of the drum. Therefore, light-shading screen 31 can be inserted into main body 10 by pressing lock-releasing button 39.

In this embodiment of the present invention, as shown in FIGS. 6 and 7, using lock-releasing button 39, latch 38b is pushed by an interconnecting member so that latch 38b retreats to be detached from sprocket 37. However, any releasing member which can separate latch 38b from sprocket 37 is adaptable in this invention.

WRITING INSTRUMENTS

FIGS. 8 through 11 show a writing equipment and a writing equipment drawing device according to another embodiment of the present invention. Referring to FIGS. 8, 9, 10 and 11, writing means 40 installed in the front surface of main body 10 of the sunvisor comprises a writing instrument 41 with an eraser 41', a writing instrument holder 42 protruded in front of main body 10 for holding writing instrument 41, a draw string 45 in which one end is connected to writing instrument 41 and the other end is connected to writing instrument drawing device 50, and a writing instrument retracting button 52 for releasing the locking of the writing instrument drawing device. Writing instrument 41 is normally kept in writing instrument holder 42. Since the writing instrument is tied with draw string 45, after a user uses the instrument, it does not become lost. Draw string 45 is long enough to accommodate the movement range in which a user writes. Preferably, writing instrument 42 is very durable.

As shown in FIG. 1, in the multipurpose automobile sunvisor of the present invention, a first memo-pad 43 is attached to one side of main body 10 and a second memo-pad 44 is attached to the other side of the main body, so that a user can use either with ease. For instance, on the memo pads are written notes, which should be written promptly, such as a telephone number, address or license plate number. If the first and second memo pads 43 and 44 are made with paper, inconveniently, they should be replaced frequently. For the semipermanent use, it is desirable to wrap the paper with a synthetic resin film. In this case, a user writes with a pencil or ball pen on memo pads 43 and 44 and easily erases with an eraser or tissue.

Figure 9:
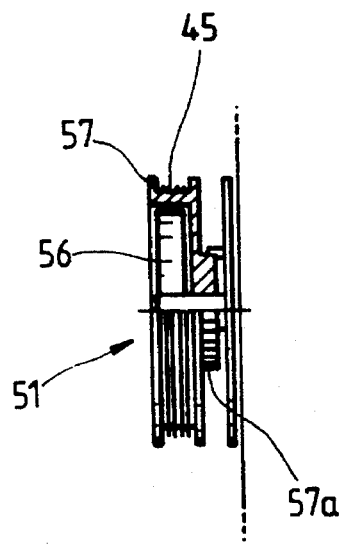
Figure 11:
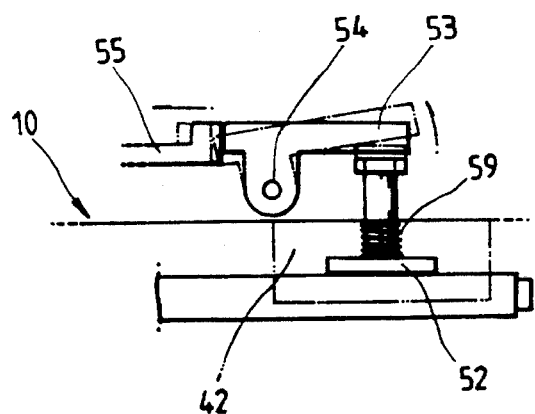

Referring to FIGS. 9, 10 and 11, writing instrument drawing device 50 has a drum assembly 51 which comprises a drum member 56 and a coil spring (not shown) of which one end is connected to the shaft of sprocket 57a and the other end is fixed on the inner surface of drum assembly 51, a sprocket 57a attached to drum member 56, a draw string 45 wound around the outer periphery of the drum member 56, a latch 55 connected with sprocket 57a, an intermediate connecting member 53 for pushing latch 55 so as to separate latch 55 from sprocket 57a, a lock-releasing button 59 for pushing intermediate connecting member 53, a spring 59 interposed between the lock-releasing button and the surface of the main body so as to support the lock-releasing button, and a plate spring 58 installed at a portion of the main body for pressing one end of latch 55 so as to interlock the latch with sprocket 57a. When a user pulls writing instrument 41, sprocket 57a connected to draw string 45 is rotated clockwise. When the user removes the pulling force, latch 55 is interlocked with sprocket 57a. Meanwhile, when lock-releasing button 52 is pressed, intermediate connecting member 53 is rotated at the axis of pin 54 to push latch 55. When latch 55 is detached from sprocket 57a, sprocket 57a is rotated counterclockwise due to the restoring force of the coil spring, so as to wind draw string 45. The operation of writing instrument drawing device 50 is similar to that of the light-shading-screen raising device. The detailed description thereof will be omitted.

Figure 12:
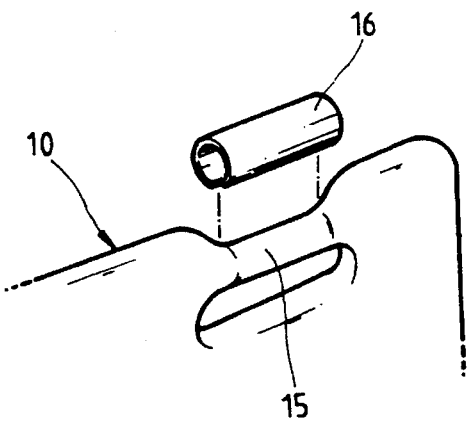
FIG. 12 shows a rod portion and a clip portion established on a main body of the multipurpose automobile sunvisor according to the present invention.

FIG. 12 show a rod 15 and a clip 16 manufactured in the upper part of the multipurpose automobile sunvisor shown in FIG. 1. Referring to FIG. 12, using resilient material, a clip 16 is manufactured in a cylindrical shape and is fixed on the ceiling of the automobile. A rod 15 may be fit into or detached from clip 16.

Figure 13:
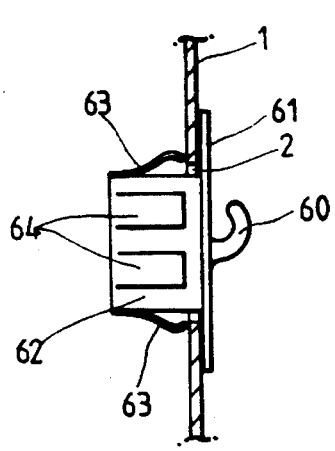
FIG. 13 shows a hook of the multipurpose automobile sunvisor according to the present invention.

FIG. 13 show a sunvisor on which a hook is mounted, instead of the clip shown in FIG. 12. Referring to FIG. 13, a flange 51 on one side of which a hook 60 is protruded, is closely adhered to a car chassis 1. Flange 61 is connected with a supporting portion 62 exposed outside car chassis 1 through a hole 2 which passes through car chassis 1. A plurality of resilient pieces 63 are protruded from supporting portion 62 to be in contact with car chassis 1 and to fix hook 60. When rod 15 shown in FIG. 12 is fit into hook 60, resilient pieces 63 contract to allow hook 60 to be drawn outward. In the conventional method, a flange is provided on both sides of the hook and a plurality of holes are perforated in the flange, so as to adhere the flange to the car chassis, using bolts and nuts. This requires complicated workmanship and makes the exterior look unsightly due to the exposed bolts. However, when the hook of the present invention is used, the work is simplified and the exterior looks appealing, because a hole is perforated in the car chassis and the hook and supporting portion are fit thereinto.

Figure 14:
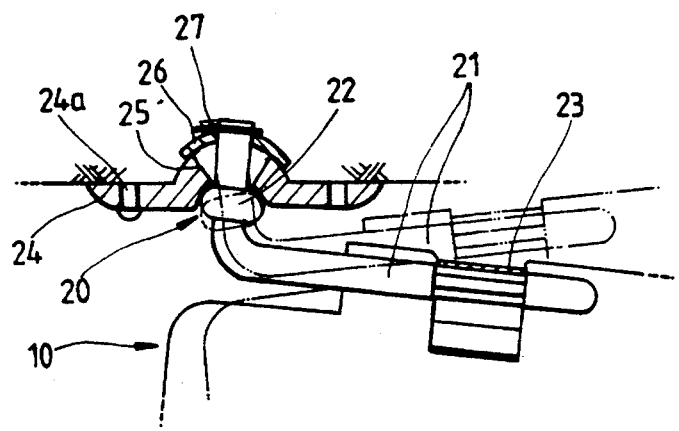
FIG. 14 shows an operational state of a hinge portion of the multipurpose automobile sunvisor shown in FIG. 1
Figure 15:
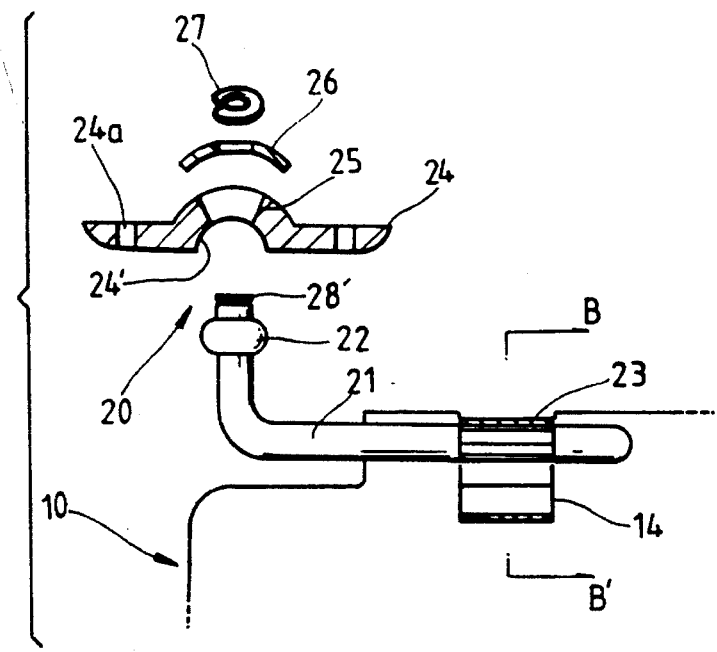
FIG. 15 shows an engagement of the hinge portion of the multipurpose automobile sunvisor shown in FIG. 1.
Figure 16:
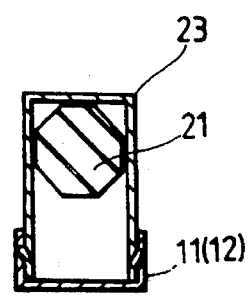
FIG. 16 is a section view token along line B—B' of FIG. 15.

FIGS. 14 through 16 show the supporting bar and the hinge portion of the multipurpose automobile sunvisor according to the present invention.

Referring to FIG. 14, a supporting bar 21 is fit into resilient clip 23 so that main body 10 is able to rotate centering supporting bar 21.

Referring to FIG. 15, since resilient clip 23 is bent to be cylindrical, it is elastically combined with supporting bar 21 in groove 14 of panel members 11 and 12. Resilient clip 23 holds supporting bar 21 with strong resilient force so as to maintain a stationary state at a location when main body 10 constituting the sunvisor rotates. Preferably, as shown in FIG. 16, supporting bar 21 is octagonal where it is held by resilient clip 23. This is because the holding force of resilient clip 23 is intensified on flat surfaces formed by the processing, and main body 10 maintains a rotated state stably without shaking. Though, in this embodiment, supporting bar 21 is octagonal, the rod may be any polyhedron having even surfaces from octagon to hexadecagon, which yields the same effect as that of the aforementioned case.

Supporting bar 21 is bent roughly at a right angle and is coupled with a groove 25 of socket portion 24 having a protruding circular portion 22. That is, supporting bar 21 is coupled with socket portion 24, in a way that a snap ring 27 is put on a slit 28 which is formed in a predetermined depth on the end of supporting bar 21, whilst a guider ring 26 is placed between snap ring 27 and the groove.

Supporting bar 21 thus can be moved horizontally, vertically or rotatably while it keeps its engagement with groove 25 of socket portion 24. As shown in FIG. 15, groove 25 penetrated on socket portion 24 and passing supporting bar 21 therethrough is preferably formed such that it has a greater diameter at the upper portion than the lower portion. This is because if groove 25 arranged on socket portion 24 is manufactured to have same diameter as that of supporting bar 21 at its upper and lower portions, main body 10 is able to move vertically and/or horizontally, however, main body 10 is not able to be tilted as shown in FIG. 14, which is disadvantageous. If groove 25 is formed to have a greater diameter at its upper portion than at the lower portion as shown in FIG. 15, therefore, main body 10 can be moved in any direction.

Figure 17:
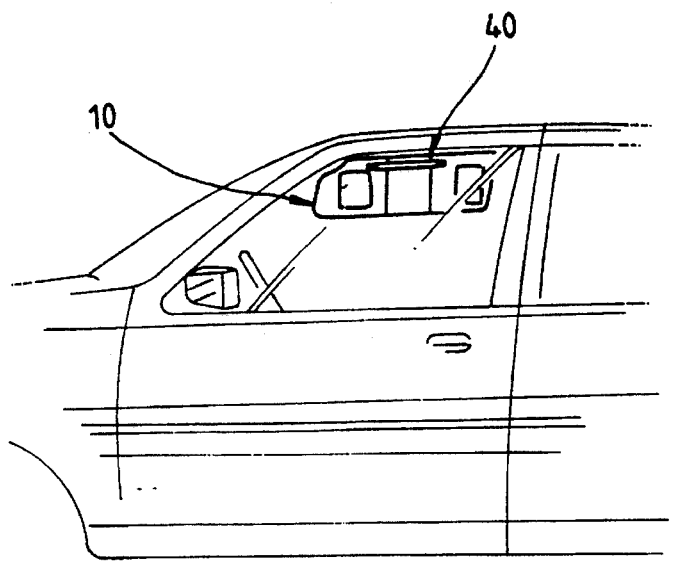
FIG. 17 is an another embodiment of the multipurpose automobile sunvisor of the present invention.

FIG. 17 illustrates another embodiment of the sunvisor, in that the sunvisor is rotated to lace the automobile's lateral window to allow its memopads to be detected by anyone, on which the driver's telephone number or the likes may be written, when parked.

INDUSTRIAL APPLICABILITY

A multipurpose sunvisor according to the present invention can be used in automobile vehicles for providing a more favorable view to a driver by effectively shielding the strong light to contribute to safe driving. Also, the multipurpose automobile sunvisor can be applied for a driver to promptly make a note in the event of an emergency such as a traffic accident or to display the owner's telephone number or address when parked.

The present invention is not limited in the above embodiment, and may be variously modified within the spirit of the technical concept of the invention.

What is claimed is:

1. A multipurpose automobile sunvisor comprising:
   a main body (10) which is roughly rectangular and comprised of a pair of panel members (11) and (12);

a bent supporting bar (21) one of which is rotatably engaged with an upper portion of said main body (10) and the other end of which is secured onto the automobile's chassis:

a socket portion (24) engaging with the other end of said bent supporting bar (21);

a light-shading portion (30) having a light-shading screen (31) tinted for screening the direct rays of light, and a receiving slot (13) built in said main body (10) for receiving thereinto said light-shading screen (31); and light-shading screen raising means (300) for pulling said light-shading screen (31) of said light-shading portion (30) into said receiving slot (13) of said main body (10); wherein, said light-shading screen raising means (300) includes:

a first drum assembly (36) having drum members (36a) and 36(b) and a coil spring (36c), said drum member (36a) being wound with draw strings (33a) and (33b) around its circumference and said coil spring installed within said first drum assembly;

a first sprocket (37) combined with said drum member (36b) and having a plurality of sawteeth which has a greater slope on one side than the other;

a latch (38b) interlocked with said sawteeth of said first sprocket (37);

a plate spring (38a) for elastically biasing said latch (38b) towards said sprocket (37) for the engagement therebetween, one end of which is engaged with a predetermined portion of said pair of panel members (11) and (12) and the other end of which contacts a portion of said latch (38b); and a lock-releasing button (39) for pushing said latch (38b) so as to detach said latch (38b) from said first sprocket (37).

2. A multipurpose automobile sunvisor as claimed in claim 1, further comprising suspending means (32) for preventing said light-shading screen (31) from becoming separated from said main body (10), said suspending means (32) having a pair of draw strings (33a) and (33b) connected with an upper portion of said light-shading screen (31) of said light-shading portion (30) and to said panel members (11) and (12).

3. A multipurpose automobile sunvisor as claimed in claim 1, further comprising stopping means (32') for preventing said light-shading screen (31) from becoming separated from said main body (10), said stopping means (32') having a protrusion (34') on the sidewall edges of said light-shading screen (31) and a protruded edge (19) which is formed on the lower portion of said receiving slot (13) of said main body (10).

4. A multipurpose automobile sunvisor as claimed in claim 1, wherein said socket portion (24) has an aperture (25) whose diameter is greater at a higher portion than at a lower portion, said bent supporting bar (21) being inserted into said aperture (25) such that said supporting bar (21) is moveable horizontally, vertically or rotatably.

5. A multipurpose automobile sunvisor as claimed in claim 1, wherein said bent supporting bar (21) of which a portion in contact with said pair of panel members (11) and (12) is shaped into a polyhedron and is held in place by an resilient clip (23).

6. A multipurpose automobile sunvisor as claimed in claim 1, further comprising a rod portion (15) whose diameter is smaller than that of said bent supporting bar (21) and which is installed on an opposite side of said pair of panel members (11) and (12) to which said bent supporting bar (21) is affixed, and a clip portion (16) of an elastic material secured on the automobile's chassis and bent so as to grip said bent supporting bar (21).

7. A multipurpose automobile sunvisor as claimed in claim 1, further comprising a rod portion (15) whose diameter is smaller than that of said bent supporting bar (21) and which is installed on an opposite side of said pair of panel members (11) and (12) to which said bent supporting bar (21) is affixed; and a hook (60) which is elastically supported by a supporting portion (62) exposed to outside of car chassis and connected to said hook (60) via a flange (61), catching said rod portion (15).

8. A multipurpose automobile sunvisor as claimed in claim 7, wherein said hook (60) is secured by an elastic contact between a plurality of elastic pieces (63) and the car chassis, said resilient pieces (63) extending from said supporting portion (62).

* * * * *